United States Patent
Ryan

(10) Patent No.: US 10,284,291 B1
(45) Date of Patent: May 7, 2019

(54) NODE CONFIGURATION IN OPTICAL NETWORK

(71) Applicant: Western Digital Technologies, Inc., San Jose, CA (US)

(72) Inventor: Robert P. Ryan, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/024,734

(22) Filed: Jun. 29, 2018

Related U.S. Application Data

(60) Provisional application No. 62/662,480, filed on Apr. 25, 2018.

(51) Int. Cl.
*H04B 10/27* (2013.01)
*H04B 10/29* (2013.01)
*H04Q 11/00* (2006.01)
*H04B 10/079* (2013.01)

(52) U.S. Cl.
CPC ........... *H04B 10/079* (2013.01); *H04B 10/27* (2013.01); *H04B 10/29* (2013.01); *H04Q 11/0062* (2013.01)

(58) Field of Classification Search
CPC combination set(s) only.
See application file for complete search history.

(56) References Cited

U.S. PATENT DOCUMENTS

| | | | |
|---|---|---|---|
| 2005/0207427 A1* | 9/2005 | Su | H04J 14/0227 370/400 |
| 2015/0016818 A1* | 1/2015 | Maeda | H04B 10/07955 398/34 |
| 2017/0124860 A1* | 5/2017 | Shih | G08C 23/04 |

OTHER PUBLICATIONS

Calient; Calient Inside 3D Mems; "Expanding the Role of 3D MEMS Technology to Meet Exploding Data Bandwidth Demands"; Jul. 2010, 7 pages.
Brian Bailey; Semiconductor Engineering; "Get Ready for Integrated Silicon Photonics"; Apr. 12, 2018; 11 pages; available at https://semiengineering.com/preparing-for-integrated-silicon-photonics/.
Finisar; "Programmable narrow-band filtering using the WaveShaper 1000S and WaveShaper 4000S"; https://www.finisar.com/sites/default/files/resources/white_paper_waveshaper_basics.pdf; 2012, 5 pages.

(Continued)

Primary Examiner — Casey L Kretzer
(74) Attorney, Agent, or Firm — Barry IP Law, P.C.

(57) ABSTRACT

A node includes a switch controller and an optical module configured to receive optical signals from at least one other node in a network. It is determined from an electrical signal for a first optical signal whether to process data from one or more subsequent optical signals or to route the one or more subsequent optical signals out of the of the node without processing data from the one or more subsequent optical signals. According to another aspect, a first optical signal is transmitted from a first node in a data processing system to a second node in the data processing system. Based on evaluation at the second node, it is determined whether to route one or more subsequent optical signals to a third node without processing data from the one or more subsequent optical signals at the second node.

36 Claims, 10 Drawing Sheets

(56) References Cited

OTHER PUBLICATIONS

Gill et al; "Distributed electrode Mach-Zehnder modulator with double-pass phase shifters and integrated inductors"; Jun. 18, 2015; 9 pages.
Jeff Stuecheli; IBM Corporation; "Power8/9 Deep Dive"; 2006, 31 pages.
Samuel Wan; eTeknix; "Intel Kaby Lake-G Processors May Feature Discrete GPU with HBM2"; 6 pages; available at https://www.eteknix.com/intel-kaby-lake-g-processors-may-feature-discrete-gpu-with-hbm2/; accessed Jun. 29, 2018.
Ajima et al; "Tofu: Interconnect for the K computer"; Fujitsu Sci. Tech. J., vol. 48, No. 3, Jul. 2012, pp. 280-285.
Zvonimir Z. Bandic; "Realizing the Next Generation of Exabyte-scale Persistent Memory-Centric Architectures and Memory Fabrics"; Jan. 24, 2018, 20 pages.
Pending U.S. Appl. No. 16/024,723, filed Jun. 29, 2018, entitled "Node With Combined Optical and Electrical Switching", Robert P. Ryan.

\* cited by examiner

NODE CONFIGURATION IN OPTICAL NETWORK

RELATED APPLICATION

This application claims the benefit of U.S. Provisional Application No. 62/662,480, entitled "COMBINED STANDARD AND OPTICAL SWITCH FOR MEMORY CENTRIC COMPUTE", filed on Apr. 25, 2018, which is hereby incorporated by reference in its entirety.

BACKGROUND

Due to increasing demands for data storage and data processing, new approaches have been proposed using networks comprising, for example, memory nodes and/or processing nodes to distribute the processing and storage of data across the nodes in the network. In some cases, networks have been proposed that include optical connections among some or all of the nodes to improve bandwidth among the nodes. In such cases, the routing of optical signals among the nodes involves converting the optical signals into electrical signals for processing at intermediate nodes before sending the optical signal back out to the next node toward the optical signal's intended final destination.

The conversion of optical signals for processing at the intermediate nodes is performed to maintain the integrity of the optical signals and to properly route the optical signals through the system. However, this processing at intermediate nodes adds latency in transmitting optical signals through the network. The latency is compounded as the number of nodes and connections in the network increases, thereby limiting the practical number of nodes and connections in such systems.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example System Environment

Figure 1:
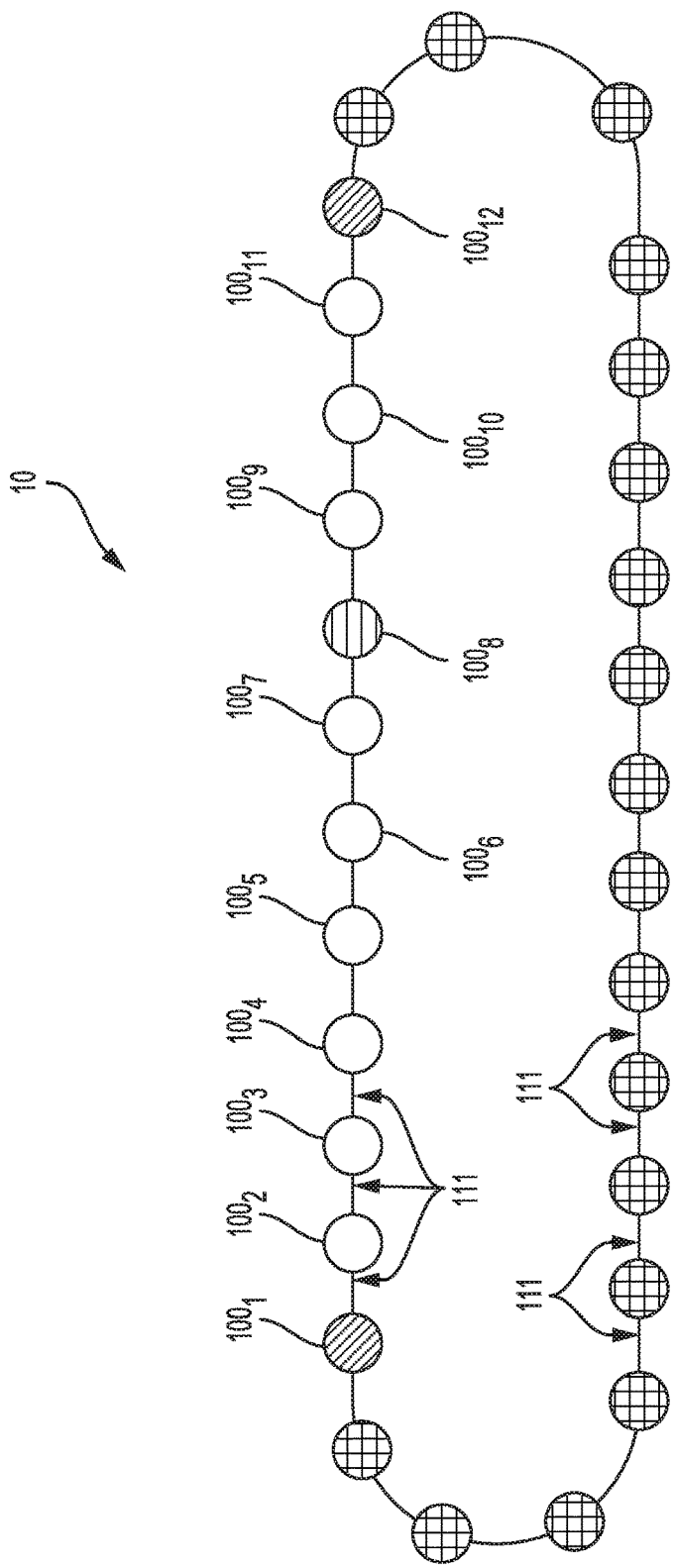
FIG. 1 illustrates an example of an optical signal path in a data processing system including nodes according to an embodiment.

FIG. 1 illustrates an example of an optical signal path in network 10 according to an embodiment. As shown in FIG. 1, network 10 includes nodes, such as nodes $100_1$ to $100_{12}$, which collectively form a data processing system. As discussed in more detail below, network 10 includes optical fibers or interconnects 111 that optically connect nodes in network 10. In some implementations, network 10 can include additional connections among other nodes not shown in FIG. 1. For example, one or more of the nodes in the torus or ring of nodes shown in FIG. 1 may connect to at least one other node not shown in FIG. 1 so as to provide an interconnected mesh network with nodes that connect to more than two nodes in network 10, such as in a 3-dimensional torus interconnect, for example, where each node connects to three other nodes.

Although a higher number of interconnects or dimensions among the nodes in a network can provide a faster connection between nodes by reducing the number of intermediate nodes or hops needed to process and send data from one node to the next, the number of optical fibers or interconnects needed in the network increases as the number of nodes increase. In cases where many nodes are in the network, such as in forthcoming networks that may include hundreds or thousands of nodes, the number of optical fibers or interconnects can become unmanageable in terms of physical space and in terms of the processing and memory resources needed at each node for directing optical signals in the network.

In one aspect, the present disclosure provides examples of nodes that can route optical signals received by the node out of the node without converting the received optical signals into electrical signals for processing data from the optical signals. As discussed in more detail below, such routing can make better use of a lower number of optical fibers or interconnects per node by making some or all of the intermediate nodes effectively transparent in terms of latency. In addition, the power consumption and resources used (e.g., memory and processing resources) at such transparent intermediate nodes for handling the routed optical signals is effectively eliminated.

In the data processing system of FIG. 1, each of the nodes may have the same construction or may differ. For example, nodes $100_1$ and $100_{12}$ may be processing or compute nodes including one or more processors for processing data stored locally at the node or at various other nodes in the data processing system. Continuing with this example, other nodes may be memory nodes including a relatively large persistent or volatile memory for storing data that may be shared with other nodes in the data processing system. In addition, nodes in the data processing system may have a Multi-Chip Module (MCM) construction where multiple components such as a memory and a switch controller or processor are mounted on the same substrate. Examples and further description of such MCM nodes are provided in co-pending U.S. patent application Ser. No. 16/024,723, entitled "NODE WITH COMBINED OPTICAL AND ELECTRICAL SWITCHING", filed on Jun. 29, 2018, the entire contents of which are hereby incorporated by reference.

In the example of FIG. 1, a series of related optical signals are transmitted from a first or initiator node $100_1$. The optical signals are intended for node $100_{12}$, but must travel through intermediate nodes $100_2$ to $100_{11}$ before reaching their target destination at node $100_{12}$. Nodes $100_1$ and $100_{12}$ are indicated as the initiator and destination nodes in FIG. 1 with diagonal cross-hatching. The nodes with boxed cross-hatching in FIG. 1 are nodes in the loop or torus that do not receive the optical signals. In this regard, initiator node $100_1$ may determine that the path shown in FIG. 1 is shorter than sending the optical signals in the opposite direction. This determination may be made, for example, based on an addressing scheme for the nodes in network 10 or may be based on a response signal or ping signal received from destination node $100_{12}$ in response to an initial signal from initiator node 101.

Intermediate nodes $100_2$, $100_3$, $100_4$, $100_5$, $100_6$, $100_7$, $100_9$, $100_{10}$, and $100_{11}$ receive the series of related optical signals, and as discussed below, route the optical signals without converting the optical signals into corresponding electrical signals for processing by the intermediate node. This significantly reduces the hop latency conventionally associated with transmitting signals through intermediate nodes in a data processing system.

As shown by the horizontal cross-hatching in FIG. 1, intermediate node $100_8$ regenerates the optical signals into optical signals with greater strength and with retiming, reshaping, and/or error correction for the data from the optical signals. This allows for the optical signals to remain strong enough and to recover from signal attenuation, data losses and/or noise incurred when traveling through intermediate nodes $100_2$, $100_3$, $100_4$, $100_5$, $100_6$, and $100_7$. As discussed in more detail below with reference to the optical signal handling subprocesses of FIGS. 7A and 7B, each of intermediate nodes $100_2$ to $100_{11}$ may determine whether to process data from optical signals. In other implementations, at least some of the intermediate nodes $100_2$ to $100_{11}$ may determine whether to process data from optical signals. The nodes may determine whether to process the data from the optical signals based on, for example, whether the node is a target destination for the optical signals (i.e., a destination node as opposed to an intermediate node), a signal strength or quality of an initial optical signal, and/or a number of previous of nodes that have previously received the initial optical signal.

As discussed in more detail below with reference to FIGS. 2 and 3, each input optical path to the node is configured to receive optical signals from outside of node 100, and an optical to electrical converter of the node is configured to convert optical signals received on the input optical path into electrical signals in processing data from the optical signals. Similarly, each output optical path from the node is configured to transmit optical signals to a next node, and an electrical to optical converter of the node is configured to convert electrical signals into optical signals to transmit via the output optical path.

In some cases, the node may determine that data from one or more optical signals received by the node is to be processed or stored at the node. In other cases, the node may convert the received data back into one or more optical signals to be sent from the node to another node via network 10. In yet other cases, the node may selectively route optical signals out of the node without processing data from the optical signals.

In this regard, nodes 100 in the data storage system of FIG. 1 can provide both optical and standard/electrical switching to achieve three different functions. As a first function, nodes 100 may receive data from network 10 for processing or storage by a local component of the node. As a second function, nodes 100 may provide a standard network or electrical switching operation by converting a received optical signal into an electrical signal, and back into an optical signal for retiming, reshaping, error correction, and/or improving the strength or quality of the optical signal to send to another node. As a third function, nodes 100 may provide an optical switching by bypassing certain electrical processing that ordinarily adds latency, such that the node acts as a "transparent" intermediate node.

The optical signal handling and routing processes performed by nodes 100 in the data processing system, such as the processes of FIGS. 5 to 9 discussed below, may be performed by a controller or processor of the node (e.g., switch controller 106 in FIG. 2) executing computer-executable instructions (e.g., a firmware or a software) stored in a memory of the node. This can ordinarily allow for adjustments to be made in such routing and handling processes, such as by changing the criteria or thresholds (e.g., an optical signal strength or a count of previous nodes) used to determine whether to route certain optical signals without processing data from the optical signal.

Figure 2:
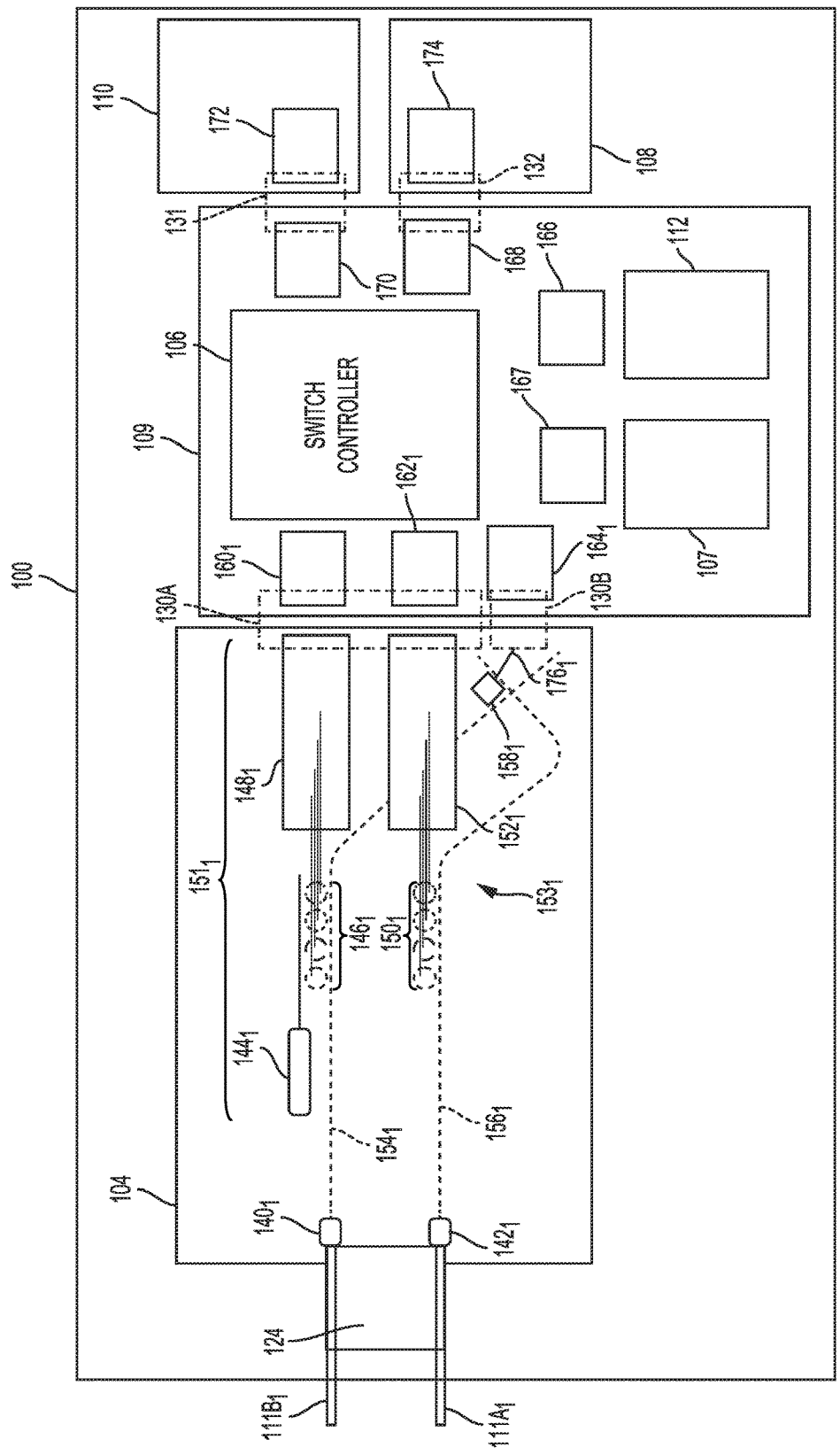
FIG. 2 is a block diagram of a node in the example network of FIG. 1 according to an embodiment.

FIG. 2 is a block diagram of an example of a node 100 in network 10 according to an embodiment. As will be appreciated by those of ordinary skill in the art, different implementations of node 100 can include different components or a different arrangement of components than those shown in FIG. 2.

As shown in FIG. 2, node 100 includes optical module 104 and System on a Chip (SoC) 109, which includes switch controller 106. Switch controller 106 includes circuitry for controlling optical module 104 and for processing data received from optical signals via optical module 104. Switch controller 106 may include, for example, one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof. In some implementations, switch controller 106 can include a programmable network switch chip or a System on a Chip (SoC) including its own memory and/or multiple processors. In this regard, switch controller 106 may store computer-executable instructions (e.g., a firmware or software) for operating node 100 including the optical routing processes discussed below.

In the example of FIG. 2, switch controller 106 forms part of SoC 109 that includes other components such as hardware accelerator 112 and processor 107. Those of ordinary skill in the art will appreciate that other implementations may include different components in SoC 109, such as an FPGA or a memory. In other implementations, switch controller 106 may not form part of an SoC, and may instead be separate from processor 107 and hardware accelerator 112.

Processor 107 includes circuitry such as, for example, one or more processors for executing instructions and can include a microcontroller, a DSP, an ASIC, an FPGA, hard-wired logic, analog circuitry and/or a combination thereof. In some implementations, processor 107 can include an SoC. In addition, processor 107 in some implementations may include a Reduced Instruction Set Computer (RISC) based processor (e.g., RISC-V, ARM) or a Complex Instruction Set Computer (CISC) based processor. As noted above, processor 107 may allow node 100 to serve as a processing node or compute node in network 10, such as for distributed computing among different nodes in network 10. Processor 107 may perform processing or computations using data received from optical module 104 and/or processing of data stored in volatile memory 108 or non-volatile memory 110.

Hardware accelerator 112 can include special purpose circuitry for processing data for switch controller 106 or for performing a particular operation or set of operations, such as a cryptographic, an analytic, or a data coherency function (e.g., ensuring memory access location coherency). In some implementations, hardware accelerator 112 may be used to correlate an address included in data from an optical signal to an optical crosspoint switch, such as optical crosspoint switch $158_1$, in optical module 104 for selectively routing an optical signal from an input optical path to an output optical path of optical module 104.

Volatile memory 108 can include a memory that interfaces with switch controller 106, processor 107, or hardware accelerator 112 to provide data stored in volatile memory 108 during execution of instructions or functions in software programs, such as an application executed by processor 107. Volatile memory 108 can include a memory that can be quickly accessed, such as a Dynamic Random Access Memory (DRAM). In other implementations, volatile memory 108 can include, or can be replaced by, other types of solid-state memory, including non-volatile memory that can be quickly accessed, such as Magnetoresistive RAM (MRAM) or other Storage Class Memories (SCMs).

Non-volatile memory 110 can allow node 100 to serve as a memory node by providing a relatively larger storage capacity than other nodes in network 10. In some implementations, data may be shared or distributed among nodes in network 10 for access or processing by different nodes on network 10. Non-volatile memory 110 includes a persistent storage for storing data across power cycles, and can include, for example, a Hard Disk Drive (HDD), a solid-state memory such as an SCM, a combination of both types of memory, or sets of such memories.

While the description herein refers to solid-state memory generally, it is understood that solid-state memory may comprise one or more of various types of memory devices such as flash integrated circuits, Chalcogenide RAM (C-RAM), Phase Change Memory (PCM, PC-RAM or PRAM), Programmable Metallization Cell RAM (PMC-RAM or PMCm), Ovonic Unified Memory (OUM), Resistive RAM (ReRAM), NAND memory (e.g., Single-Level Cell (SLC) memory, Multi-Level Cell (MLC) memory, or any combination thereof), NOR memory, EEPROM, Ferroelectric Memory (FeRAM), MRAM, other discrete NVM chips, or any combination thereof.

As noted above, node 100 may include an MCM construction or may be a device with a different type of construction, such as components on a PCB with traces between some or all of the components. In addition, other implementations of node 100 may include a different number of components or a different arrangement of components. For example, other implementations may not include one or more of hardware accelerator 112, processor 107, volatile memory 108, or non-volatile memory 110. As such an example, a type of SCM such as MRAM, PCM, ReRAM, or another type of SCM, may be used as non-volatile memory 110, in which case volatile memory 108 may be omitted. In addition, one or more of the components in FIG. 2 may be integrated together in some implementations, such as where switch controller 106, processor 107, and hardware accelerator 112 are formed together as a single SoC, as shown in the example of FIG. 2, or where processor 107 may be combined with switch controller 106 as a single controller/processor unit. In yet other implementations, additional components may be included in node 100, such as by adding an FPGA to node 100.

Optical module 104 includes output optical path $154_1$ and input optical path $156_1$. Output optical path $154_1$ connects to fiber connect 124 via coupler $140_1$ to route optical signals out of node 100 through optical fiber $111B_1$. Laser $144_1$ supplies light to modulators $146_1$ shown as rings in FIG. 2 at different frequencies corresponding to different wavelengths or colors of light. In some implementations, laser $144_1$ may include a Continuous Wave (CW) comb laser.

The different modulators $146_1$ (represented by four circles with different line markings to denote the different modulators) are activated by electrical signals sent from driver amplifier $148_1$ in response to electrical signals received from switch controller 106. In this regard, laser $144_1$, modulators $146_1$ and driver amplifier $148_1$ form electrical to optical converter $151_1$ configured to convert electrical signals received from switch controller 106 into optical signals to transmit outside of node 100 via output optical path $154_1$. In the example of FIG. 2, modulators $146_1$ are shown as ring modulators. Other implementations may use different components for an electrical to optical converter, such as, for example, disk modulators, Mach Zehnder structures, graphene on D-microfiber modulators, or Micro Electro Mechanical System (MEMS) mirrors in place of ring modulators.

In the example of FIG. 2, the activation of modulators $146_1$ allow for light at a particular frequency to travel on output optical path $154_1$ as an optical signal output from optical module 104. In this regard, multiple optical signals at different frequencies can travel simultaneously on the same output optical path $154_1$ to increase the bandwidth of data traveling out of optical module 104. Electrical to optical converter $151_1$ for output optical path $154_1$ is configured to convert electrical signals received from switch controller 106 into optical signals to transmit outside of node 100 via output optical path $154_1$, and multiplex multiple optical signals for simultaneous transmission on output optical path $154_1$.

In addition, optical module 104 can include a plurality of output optical paths and a plurality of input optical paths, each capable of simultaneously carrying different optical signals at different frequencies. Although four resonators and four modulators are shown in the example of FIG. 2, other implementations may use a different number of resonators and modulators for a different number of frequencies of light. For example, 12 different frequencies of light (i.e., channels) each providing 100 Gb/s can be multiplexed into one optical path providing 1.2 TB/s on the optical path. If 24 output optical paths 154 and 24 input optical paths 156 are used in a given node, the total bandwidth for the node in such an example would be approximately 28 TB/s.

In the example of FIG. 2, input optical path $156_1$ connects to input optical fiber $111A_1$ through fiber connect 124 and coupler $142_1$. Optical signals received via input optical fiber $111A_1$ are detected by ring resonators and corresponding Avalanche PhotoDiodes (APDs) $150_1$ that provide electrical signals to TransImpedance Amplifier (TIA) $152_1$. In some implementations, one or more components of optical to electrical converter $153_1$, such as ring resonators and/or TIA $152_1$ may provide reshaping of the signals, such as by filtering out frequencies outside of a particular optical or electrical frequency band. The electrical signals are then provided to switch controller 106 for processing. In this regard, resonators and APDs $150_1$, together with TIA $152_1$ form optical to electrical converter $153_1$, which is configured to convert optical signals received on input optical path $156_1$ into electrical signals for processing by switch controller 106. Other implementations may use different components for an optical to electrical converter, such as by using a different type of photodiode, or by using disk resonators, Mach Zehnder structures, or MEMS mirrors in place of ring resonators.

In addition, some implementations may include one or more level splitters in optical to electrical converter $153_1$ configured to receive a portion of an optical signal for measuring a signal strength of the optical signal. The signal strength may then be used by switch controller 106 for determining whether to route subsequent optical signals via optical crosspoint switch $158_1$ or to process data from subsequent optical signals to regenerate the optical signals with a greater signal strength or amplitude. In yet other cases, a level splitter may be used to periodically observe input optical path $156_1$ for completion of a series of related optical signals or to identify an error or exception in the transmission of optical signals on input optical path $156_1$.

As discussed in more detail below with reference to FIG. 3, optical module 104 also includes optical crosspoint switches 158, such as optical crosspoint switch $158_1$, which is configured to selectively route optical signals received by optical module 104 out of node 100 without node 100 buffering data from the received optical signals or without converting the received optical signals into electrical signals for processing data from the received optical signals by switch controller 106. Optical crosspoint switch $158_1$ may include, for example, ring resonators, disk resonators, Mach Zehnder structures, or MEMS mirrors that when activated, direct optical signals from input optical path $156_1$ onto output optical path $154_1$.

As used herein, an optical crosspoint switch refers to a switch that can direct light from an input optical path to an output optical path. Optical module 104 includes one or more such optical crosspoint switches, and may optionally include one or more arrays of such optical crosspoint switches, as described in more detail below with reference to FIG. 4.

The activation of optical crosspoint switch $158_1$ at a particular frequency may correspond to a deactivation of a resonator $150_1$ and the disabling of an electrical path for that particular frequency so that the optical signals received for that frequency of light are not converted and/or transmitted to switch controller 106. In some implementations, an entire amplifier, such as TIA $152_1$ may be powered off in addition to other components along the disabled electrical path, such as Seializer/Deserializer (SerDes) interface $162_1$, or other circuitry along the electrical path to switch controller 106. This powering off of electrical components can ordinarily reduce power consumption of node 100, which may be multiplied for a plurality of optical input paths in node 100.

Driver amplifier $148_1$ for output optical path $154_1$ connects to transmitting SerDes interface $160_1$ of SoC 109 via high speed silicon interposer 130A. In addition, TIA $152_1$ for input optical path $156_1$ connects to SerDes interface $162_1$ of SoC 109 via high speed silicon interposer 130A. Transmitting SerDes interface $160_1$ of SoC 109 may receive different electrical signals in parallel from switch controller 106 for data to be sent in different respective optical signals on output optical path $154_1$. Transmitting SerDes interface $160_1$ serializes the data from the parallel electrical signals received from switch controller 106 for transmission through interposer 130A. Driver amplifier $148_1$ of optical module 104 converts the high speed serial data received through interposer 130A to electrical signals to activate respective modulators $146_1$. In some implementations, driver amplifier $148_1$ may also provide for reshaping or filtering of the electrical signals.

Receiving SerDes interface $162_1$, on the other hand, may receive serialized data in the form of electrical signals from TIA $152_1$ representing different optical signals received on input optical path $156_1$. Receiving SerDes interface $162_1$ deserializes the data received via interposer 130A into parallel electrical signals corresponding to the different optical signals for processing by switch controller 106.

In other implementations, one or both of SerDes interfaces $160_1$ and $162_1$ may instead be located on the other side of interposer 130A so as to be included in optical module 104. However, the location of SerDes interfaces $160_1$ and $162_1$ in SoC 109 reduces the number of connections needed.

The use of receiving SerDes interface $162_1$ and transmitting SerDes interface $160_1$ in FIG. 2 can ordinarily allow for a relatively large number of optical paths and optical crosspoint switches 158 for a given size or number of connections in interposer 130A. As discussed in more detail below, other components connected to SoC 109, such as non-volatile memory 110 or volatile memory 108 may instead use a parallel interface or parallel bus without serialization and deserialization. In this regard, parallel connections such as a parallel interface or parallel bus that travels a relatively short distance (e.g., within the same MCM node 100) are less likely to experience skewing or a temporal mismatch of the data among the high speed parallel signals as compared to other data paths that have a longer distance. The data received via input optical paths, on the other hand, may typically be received as one or more serialized channels to reduce the likelihood of skewing. In some implementations, SerDes interfaces $160_1$ and/or $162_1$ can provide for retiming of the signals as they pass through the node to their target destination node.

Although SerDes interfaces $160_1$ and $162_1$ may provide for retiming and a space savings with a greater bandwidth for a given connection, the serialization and deserialization of data can add latency to the processing of data for a given optical signal and consume power. As discussed in more detail below, the use of optical crosspoint switch $158_1$ can avoid the latency added by an intermediate node in processing electrical signals converted by the node (e.g., the conversion of optical signals by optical to electrical converter $153_1$). Such processing by an intermediate node can include, for example, transfer of data from an optical signal by SerDes interfaces $160_1$ and $162_1$ or buffering such data by components of node 100, such as by switch controller 106. This latency or hop latency increases with each intermediate node that converts the optical signal into an electrical signal for processing by the node before converting the electrical signal back into the optical signal for transmission to the next node. The use of one or more optical crosspoint switches 158 in node 100 can eliminate this hop latency, which can facilitate more nodes and/or less interconnections (i.e. optical fiber connections) between the nodes in network 10 by reducing the latency for optical signals to travel through more nodes than possible in networks with conventional nodes.

SoC 109 in the example of FIG. 2 includes switch module $164_1$, which controls the activation of optical crosspoint switch $158_1$ via high speed silicon interposer 130B and connection $176_1$ in optical module 104. In some implementations, switch module $164_1$ may include a driver circuit and/or one or more timers for controlling activation of optical crosspoint switch $158_1$.

As discussed in more detail below with reference to FIGS. 3 and 4, each optical path may include multiple optical crosspoint switches 158 for selectively routing optical signals from one input optical path to an output optical path without converting the optical signals into electrical signals for processing by switch controller 106. In such implementations, each input or output optical path may include its own switch module 164 for activating the optical crosspoint switches 158 on the optical path, or even for activating particular resonators within each optical crosspoint switch 158 on the optical path.

As shown in FIG. 2, SoC 109 also includes parallel interfaces 166 and 167 for interfacing hardware accelerator 112 and processor 107, respectively, with switch controller 106. Providing a parallel interface ordinarily allows for a higher bandwidth of data between switch controller 106 and components such as processor 107 and hardware accelerator 112.

In addition, to parallel links or interfaces for components within SoC 109, the example of FIG. 2 also includes parallel interfaces 170 and 168 for connection to non-volatile memory 110 and volatile memory 108 via high speed silicon interposers 131 and 132, respectively. The use of parallel interfaces provides a higher bandwidth of data between switch controller 106 and components outside of SoC 109, such as non-volatile memory 110 and volatile memory 108. For their part, non-volatile memory 110 and volatile memory 108 include parallel interfaces 172 and 174, respectively, for sending and receiving data to components in SoC 109, such as switch controller 106, processor 107, or hardware accelerator 112.

Examples and further description of parallel interfaces and parallel buses within a node are provided in co-pending U.S. patent application Ser. No. 16/024,723, filed on Jun. 29, 2018, and incorporated by reference above.

Figure 3:
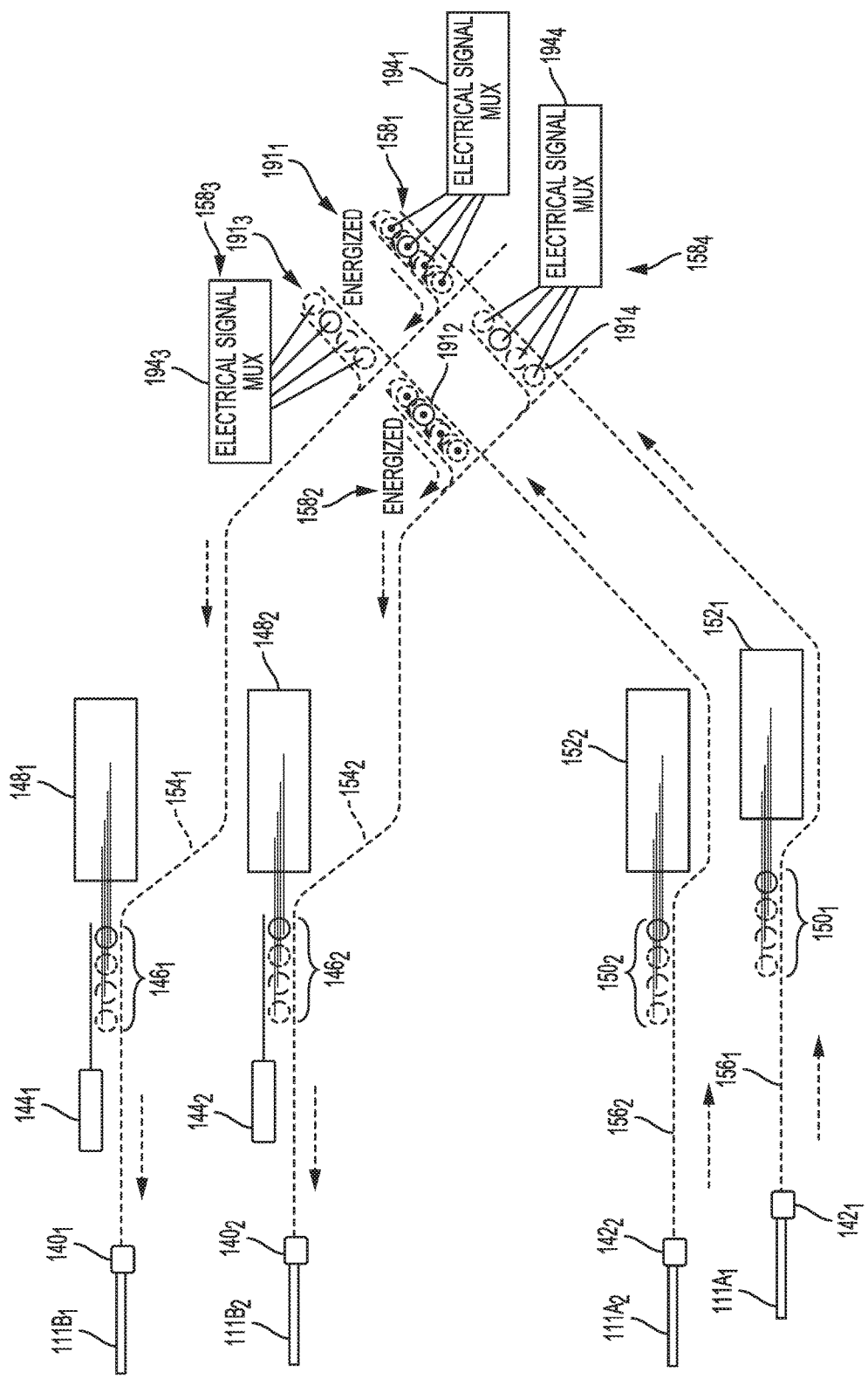
FIG. 3 depicts an optical module of a node according to an embodiment.

FIG. 3 depicts portions of an optical module according to an embodiment. Components shown in FIG. 3 with similar reference numbers to components of optical module 104 shown in FIG. 2 have a similar description as provided above for FIG. 2.

As shown in FIG. 3, input optical path $156_1$ connects with output optical paths $154_1$ and $154_2$ via optical crosspoint switches $158_1$ and $158_4$, respectively. In addition, input optical path $156_2$ connects with output optical paths $154_1$ and $154_2$ via optical crosspoint switches $158_3$ and $158_2$, respectively. With this arrangement, optical signals received by optical module 104 on either of input optical paths $156_1$ or $156_2$ can be selectively routed onto either of output optical paths $154_1$ or $154_2$.

Each of optical crosspoint switches $158_1$, $158_2$, $158_3$, and $158_4$ in the example of FIG. 3 include ring resonators that can be selectively activated by an electrical signal multiplexer of the optical crosspoint switch, such as by electrical signal multiplexers $194_1$, $194_3$, $194_4$. The electrical signal multiplexer for optical crosspoint switch $158_2$ is not shown in FIG. 3 to avoid unnecessarily obscuring optical crosspoint switch $158_2$.

Electrical signal multiplexers 194 can receive electrical activation signals from a switch module, such as switch module $164_1$ via connection $176_1$ in FIG. 2. In some implementations, all resonators 191 in a particular optical crosspoint switch 158 may be activated at the same time. In other implementations, one or more resonators of all of the resonators 191 may be activated to only route certain channels or frequencies of light from the input optical path to output optical path. As used herein, activation of an optical crosspoint switch can refer to the activation of at least a portion of the optical crosspoint switch.

In the example of FIG. 3, optical crosspoint switch $158_1$ is activated so that ring resonators $191_1$ in optical crosspoint switch $158_1$ are energized to pass the optical signals received on input optical path $156_1$ onto output optical path $154_1$. Similarly, optical crosspoint switch $158_2$ is activated so that ring resonators $191_2$ in optical crosspoint switch $158_2$ are energized to pass the optical signals received on input optical path $156_2$ onto output optical path $154_2$.

As will be appreciated by those of ordinary skill in the art, other implementations of an optical module may have different components or include a different arrangement of components than those shown in FIG. 3. For example, in other implementations, optical crosspoint switches 158 may be a different type of optical switch with a different construction. In this regard, optical crosspoint switches 158 may instead use disk resonators, Mach Zehnder structures, or MEMS mirrors in place of ring resonators 191.

Figure 4:
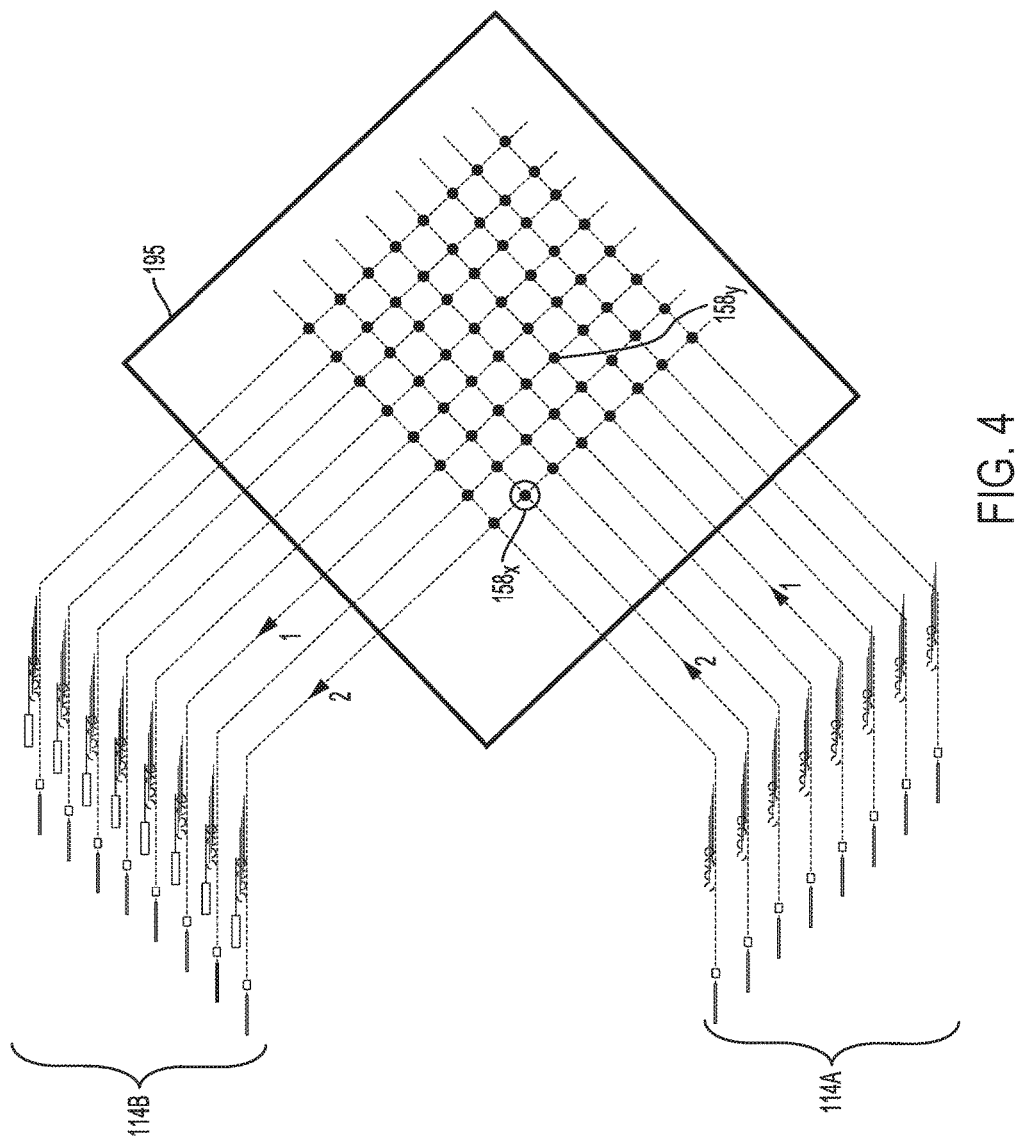
FIG. 4 depicts a switch array of an optical module of a node according to an embodiment.

FIG. 4 depicts switch array 195 of an optical module according to an embodiment. As shown in FIG. 4, a plurality of input optical paths 114A enter switch array 195 and connect with each output optical path of a plurality of output optical paths 114B at optical crosspoint switches 158, which are indicated as black dots at the intersection of the optical paths in FIG. 4. Switch array 195 may include, for example, an optical substrate including silicon, silicon nitride, and/or III-V semiconductor materials as waveguides for the optical paths.

In the example of FIG. 4, optical signal 1 is received via an input optical path of input optical paths 114A. Optical crosspoint switch 158y along the input optical path in switch array 195 is activated or energized so that optical signal 1 is routed or redirected out of switch array 195 on the output optical path intersecting the input optical path at optical crosspoint switch 158y. As noted above, optical crosspoint switch 158y may be activated for all channels or frequencies of light or may only be activated for particular channels or frequencies of light.

Optical signal 2 is received via a different input optical path of input optical paths 114A. Optical crosspoint switch 158x along the input optical path in switch array 195 is activated or energized so that optical signal 2 is routed or redirected out of switch array 195 on the output optical path intersecting the input optical path at optical crosspoint switch 158x. As noted above, optical crosspoint switch 158x may be activated for all channels or frequencies of light or may only be activated for particular channels or frequencies of light.

Other implementations may include a different configuration of optical paths and optical crosspoint switches. For example, some implementations may include one or more input optical paths with only one optical crosspoint switch, or optical crosspoint switches for only a subset of all of the output optical paths in optical module 104 or switch array 195. In yet other implementations, optical module 104 may include multiple switch arrays 195 that share optical paths to increase the number of optical paths and optical crosspoint switches in node 100. In such implementations, optical amplifiers, such as those made from III-V semiconductor materials may be used to improve the signal quality or strength of the optical signals.

Example Optical Signal Routing and Handling Processes

Figure 5:
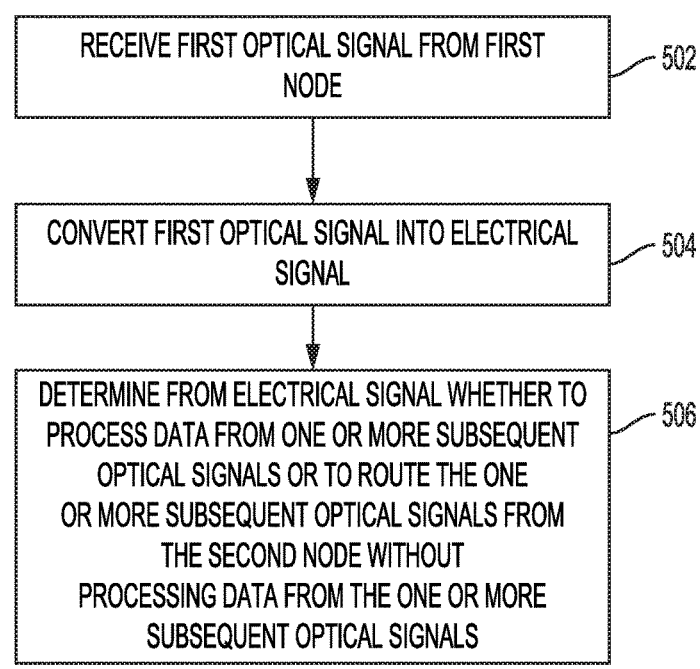
FIG. 5 is a flowchart of an initial optical signal handling process at a node according to an embodiment.

FIG. 5 is a flowchart of an initial optical signal handling process at a node according to an embodiment. The initial optical signal handling process of FIG. 5 may be performed by switch controller 106 executing computer-executable instructions (e.g., firmware or software). With reference to FIG. 1 above, the process of FIG. 5 may be performed by each node in a data processing system or may be performed by a subset of nodes in the data processing system, such as by a subset of nodes in the data processing system that are included in a relatively longer ring or torus of optically connected nodes (e.g., longer than a predetermined number of nodes).

In block 502, a second node receives a first optical signal from a first node in the data processing system of network 10. The first optical signal is received by an optical module of the second node. With reference to the example node 100 of FIG. 2, the first optical signal can be received by input optical path $156_1$ via optical fiber $111A_1$.

In block 504, the first optical signal is converted into an electrical signal by an optical to electrical converter of the optical module of the second node. In the example of node 100 in FIG. 2, optical to electrical converter $153_1$ can convert the first optical signal into an electrical signal and send the electrical signal to switch controller 106 via interposer 130A.

In block 506, switch controller 106 determines from the electrical signal received from the optical to electrical converter whether to process data from one or more subsequent optical signals or to route the one or more subsequent optical signals out of node 100 without processing data from the one or more subsequent optical signals. The processing of data from the one or more subsequent optical signals can include at least one of converting the one or more subsequent optical signals into corresponding one or more electrical signals using the optical to electrical converter and buffering data from the one or more subsequent optical signals in a memory of node 100. In some cases, a buffer of switch controller 106 may be used to buffer data from the one or more subsequent optical signals. In other cases, a buffer of node 100 external to switch controller 106 may be used in processing the data from the one or more subsequent optical signals.

As discussed above, routing the one or more subsequent optical signals from node 100 without processing data from the one or more subsequent optical signals can significantly decrease the intermediate node latency in directing the one or more subsequent optical signals through network 10. In other cases, node 100 may determine in block 506 that data from the one or more subsequent optical signals are to be processed by node 100. In such cases, node 100 may process data from the one or more subsequent optical signals to regenerate the optical signals for transmission from node 100 or may process the data if it is determined that node 100 is the destination node for the optical signals.

Figure 6:
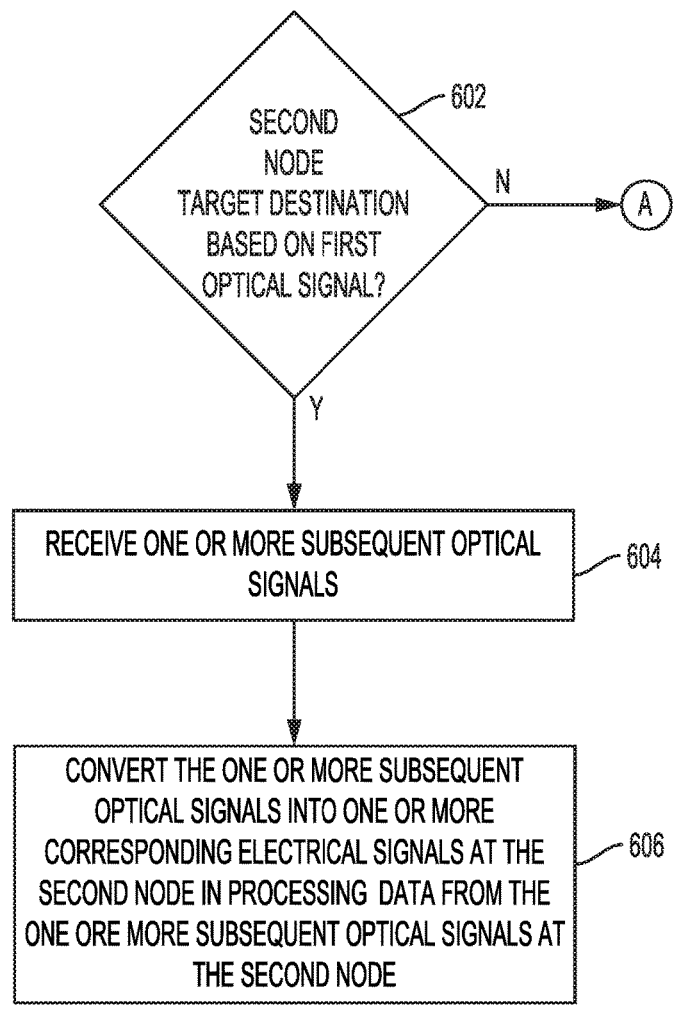
FIG. 6 is a flowchart for an optical signal handling process according to an embodiment.

FIG. 6 is a flowchart for an optical signal handling process according to an embodiment. The optical signal handling process of FIG. 6 can be performed by switch controller 106 executing computer-executable instructions. In some implementations, the optical signal handling process of FIG. 6 can replace block 506 in FIG. 5 and continue from the initial optical signal handling process of FIG. 5.

In block 602 of FIG. 6, switch controller 106 determines whether the second node is a target destination or an intermediate node for the one or more subsequent optical signals based on the first optical signal. In this regard, switch controller 106 may determine from a corresponding first electrical signal derived from the first optical signal whether an address indicated by data from the first optical signal indicates an address corresponding to the second node. If so, the second node is the target destination for the one or more subsequent optical signals. If not, the second node is an intermediate node for the one or more subsequent optical signals.

Switch controller 106 may access or identify an address from data from the first optical signal stored in a buffer using, for example, deep packet inspection. In some implementations, a destination address may be indicated by a flag or may occupy a particular position, such as in a header of a data packet buffered in the buffer. The data buffered for the first optical signal may also indicate whether it is an initial optical signal or a data path command signal for a subsequent series of related optical signals to be received on the input optical path.

If it is determined in block 602 that the second node is the target destination, node 100 receives one or more subsequent optical signals in block 604 via optical module 104. The one or more subsequent optical signals are received on the same input optical path (e.g., input optical path $156_1$ in FIG. 2) as the first optical signal.

In block 606, the one or more subsequent optical signals are converted into one or more corresponding electrical signals in processing data from the optical signals at the second node. The one or more subsequent optical signals may be converted by an optical to electrical converter of optical module 104 for a given duration of time, for a particular number of optical signals, or until a final optical signal is received. In this regard, the initial optical signal may indicate a period of time or a data size for the series of optical signals including the one or more subsequent optical signals. In other implementations, a final optical signal may include data such as a flag or packet number indicating that it is the final optical signal for the series of optical signals including the one or more subsequent optical signals.

Switch controller 106 internally routes data from the corresponding one or more electrical signals for further processing of the data from the one or more subsequent optical signals at the second node. For example, switch controller 106 may route data from the optical signals to processor 107 to perform operations using the data or to modify the data. In other examples, switch controller 106 may route the data from the one or more subsequent optical signals to non-volatile memory 110 or to volatile memory 108 for storage at the second node.

Figure 7A:
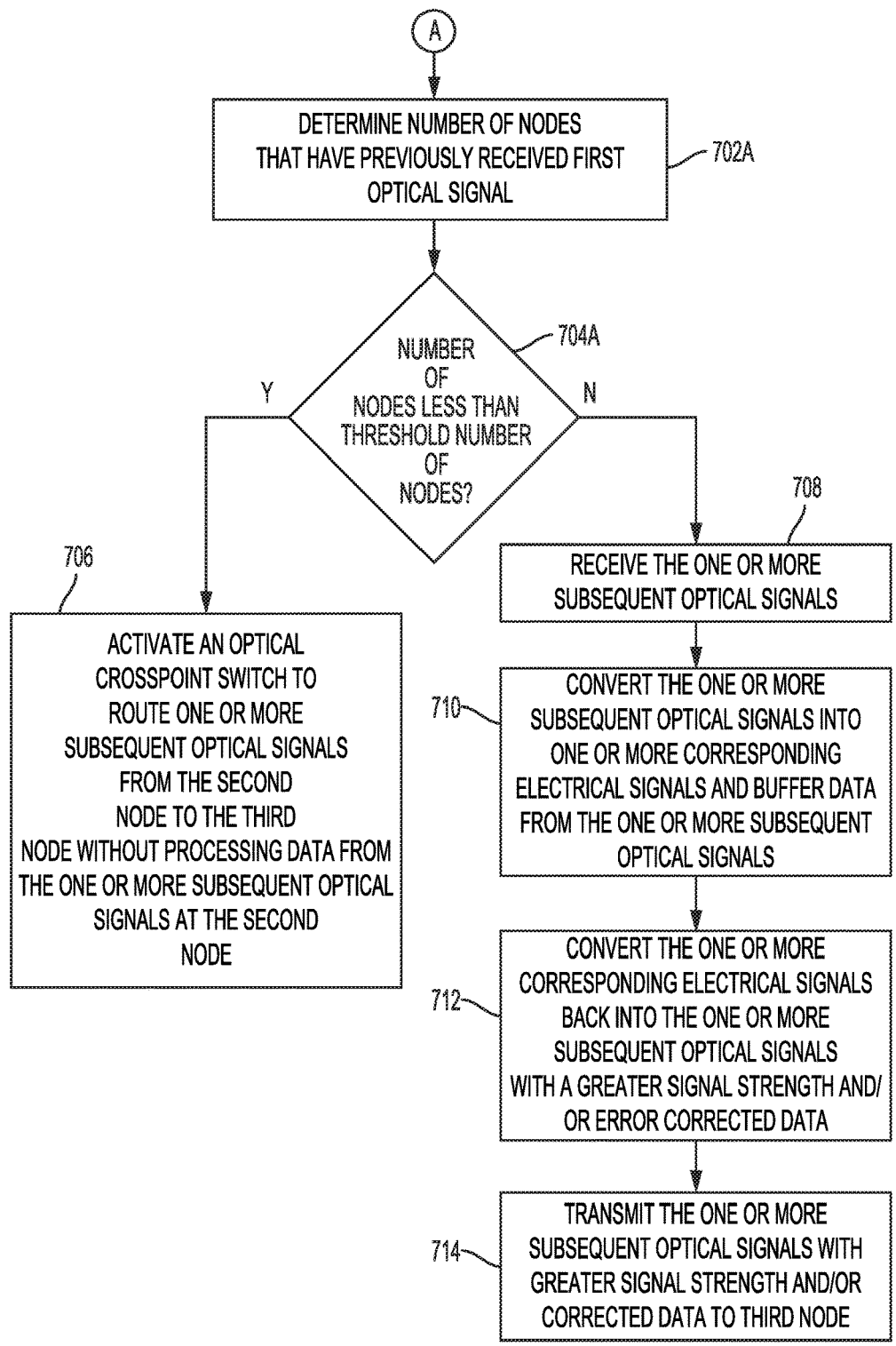
FIG. 7A is a flowchart for an optical signal handling subprocess according to an embodiment.
Figure 7B:
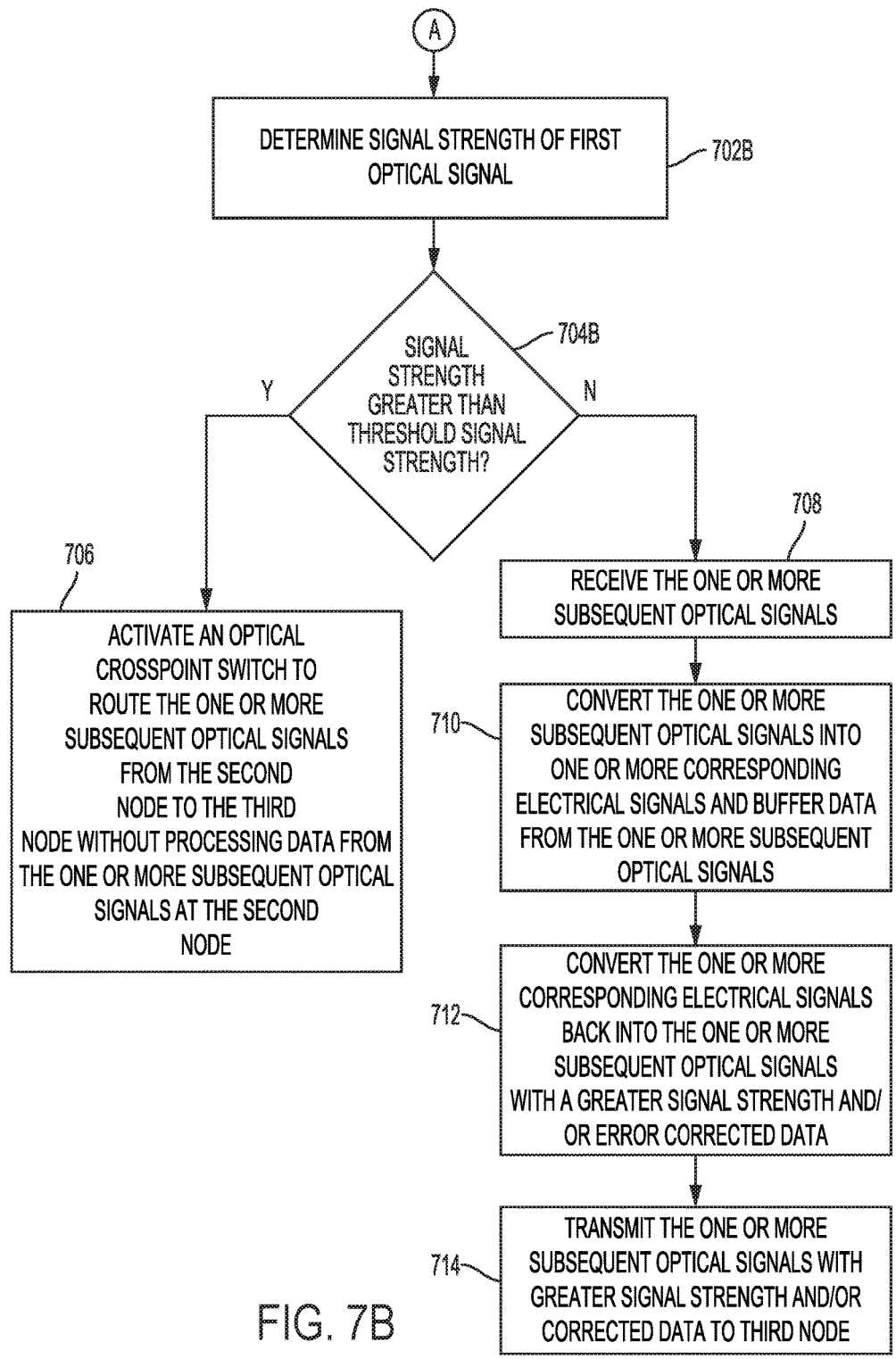
FIG. 7B is a flowchart for an optical signal handling subprocess according to an embodiment.

On the other hand, if it is determined in block 602 that the second node is not the target destination for the one or more subsequent optical signals, the process of FIG. 6 continues to the optical signal handling subprocess of FIG. 7A or FIG. 7B.

Although blocks 602 to 606 are shown as being distinct in FIG. 6, some of the operations in these blocks may overlap in time. For example, the conversion of the one or more subsequent optical signals into one or more corresponding electrical signals may overlap with receiving additional optical signals of the one or more subsequent optical signals.

FIG. 7A is a flowchart for an optical signal handling sub-process according to an embodiment. The optical signal handling subprocess of FIG. 7A can be performed by switch controller 106 executing computer-executable instructions. In some implementations, the optical signal handling subprocess of FIG. 7A can follow from block 602 in FIG. 6 if it is determined from the first optical signal that the second node is not the target destination for the one or more subsequent optical signals. As with the processes of FIGS. 5 and 6 discussed above, the process of FIG. 7A can be performed by each node in a data processing system or by a subset of nodes in the data processing system, such as by a subset of nodes in the data processing system that are included in a relatively longer ring or torus of optically connected nodes.

In block 702A, switch controller 106 determines a number of nodes that have previously received the first optical signal. In some implementations, the data from the first optical signal may include a count that is incremented by each intermediate node that processes data from the first optical signal. For example, each node that receives the first optical signal may convert the first optical signal into a corresponding first electrical signal and buffer data from the first electrical signal before increasing a count value in the data and converting the data for the first optical signal back into an optical signal for transmission from the node. The second node in block 702A may then determine the number of nodes that have previously received the first optical signal from the count value.

In block 704A, it is determined whether the number of nodes that have previously received the first optical signal is less than a threshold number of nodes. For example, the second node may compare the number of previous nodes determined in block 702A to a threshold number of nodes, such as five previous nodes. The threshold number of nodes can be based on, for example, an average or expected number of nodes in network 10 before a signal quality or signal strength falls below a desired level. With reference to the example of FIG. 1, the threshold number of nodes could be seven nodes, such that by the time the first optical signal reaches intermediate node $100_8$, the threshold number of seven nodes have previously received the first optical signal. Node $100_8$ would then determine in block 704A that the number of nodes previously receiving the first optical signal is not less than the threshold number of nodes.

If it is determined that the number of previous nodes is less than the threshold number of nodes in block 704A, the process of FIG. 7A continues to block 706 to activate an optical crosspoint switch or portion thereof of the second node to route one or more subsequent optical signals from the second node to a third node without processing data from the one or more subsequent optical signals at the second node. With reference to the example portion of an optical module in FIG. 3, switch controller 106 may activate or energize optical crosspoint switch $158_1$ by sending electrical signals to electrical signal multiplexer $194_1$ to energize one or more resonators $191_1$ and to direct optical signals received on input optical path $156_1$ onto output optical path $154_1$.

In some implementations, switch controller 106 may also power off or disable certain electrical components used for processing data from the optical signals received on input optical path $156_1$. For example, and as noted above, an entire amplifier, such as TIA $152_1$ in FIG. 2 may be powered off in addition to other components along the disabled electrical path, such as SerDes interface $162_1$, or other circuitry along the electrical path to switch controller 106. This powering off of electrical components can ordinarily reduce power consumption of the second node.

If it is determined in block 704A that the determined number of nodes that have previously received the first optical signal is not less than the threshold number of nodes, the second node in block 708 receives the one or more subsequent optical signals via optical module 104. The one or more subsequent optical signals are received on the same input optical path as the first optical signal.

In block 710, the one or more subsequent optical signals are converted into one or more corresponding electrical signals in processing data from the one or more subsequent optical signals. In the example process of FIG. 7A, the processing of data from the one or more subsequent optical signals includes converting the optical signals into corresponding electrical signals and buffering the data from the signals. The processing by the second node can further include, for example, error correction of data from the one or more subsequent optical signals. Such error correction may be performed using techniques such as Error Correcting Code (ECC) with parity data or redundant data included in the data from the one or more subsequent optical signals.

In block 712, the one or more corresponding electrical signals are converted back into the one or more subsequent optical signals with at least one of a greater signal strength and error corrected data. In this regard, switch controller 106 of the second node may send corrected data or the original data from the one or more subsequent optical signals to driver amplifier $148_1$ of electrical to optical converter $151_1$ for conversion back into the one or more subsequent optical signals using laser $144_1$ and modulators $146_1$.

In block 714, the second node transmits the one or more subsequent optical signals with at least one of a greater signal strength and corrected data from optical module 104 to the third node. In addition, the regeneration of the optical signals in block 712 can include other improvements to the signals, such as reshaping or retiming. These improvement in the signal strength and/or the quality of the optical signals can allow the optical signals to continue through more nodes in network 10 than would otherwise be possible without the processing at the second node.

As noted above, the processing at intermediate nodes can be limited to an as-needed basis as opposed to performing such processing at each intermediate node to reduce the amount of cumulative delay added by such processing, such as by buffering the data and serializing/deserializing the data across SerDes interfaces at the node. By decreasing the latency in network 10, it is ordinarily possible to increase the number of nodes in network 10 and/or use less optical connections in network 10 since optical signals can travel through more intermediate nodes in a given period of time. In addition to reducing latency for optical signals traveling through network 10, the foregoing processes can also reduce power at the node by temporarily powering off certain electrical components used for processing data from routed optical signals. The consumption of processing and memory resources at the node is also reduced by not having to process the one or more subsequent optical signals.

Although blocks 702A to 714 are shown as being distinct in FIG. 7, some of the operations in these blocks may overlap in time. For example, the conversion of the one or more subsequent optical signals into one or more corresponding electrical signals may overlap with receiving additional optical signals of the one or more subsequent optical signals and converting the one or more corresponding optical signals back into optical signals.

FIG. 7B is a flowchart for an optical signal handling subprocess according to an embodiment, which can be performed in place of the optical signal handling subprocess of FIG. 7A in some implementations. The optical signal handling subprocess of FIG. 7B can be performed by switch controller 106 executing computer-executable instructions. In some implementations, the optical signal handling subprocess of FIG. 7B can follow from block 602 in FIG. 6 if it is determined from the first optical signal that the second node is not the target destination for the one or more subsequent optical signals. As with the processes discussed above for FIGS. 5 to 7A, the process of FIG. 7B may be performed by each node in a data processing system or by a subset of nodes in a data processing system.

The optical signal handling subprocess of FIG. 7B is similar to the optical signal handling subprocess of FIG. 7A, except that the determination and comparison made in blocks 702B and 702B in FIG. 7B differ from those made in blocks 702A and 704A of FIG. 7A.

As shown in block 702B of FIG. 7B, a signal strength of the first optical signal is determined. The signal strength may be measured, for example, with the use of a level splitter of an optical to electrical signal converter of optical module 104 that sends an indication to switch controller 106 of the signal strength. In other implementations, a TIA amplifier of an optical to electrical signal converter (e.g., TIA $152_1$ in FIG. 2) may indicate a signal strength when sending the data from the first optical signal to switch controller 106.

In block 704B, it is determined whether the signal strength of the first optical signal is greater than a threshold signal strength. For example, a value representing a signal strength may be provided by an optical to electrical converter and compared to a threshold value by switch controller 106. If switch controller 106 determines that the signal strength is greater than the threshold signal strength in block 704B, the process of FIG. 7B continues to block 706 to activate an optical crosspoint switch and route the one or more subsequent optical signals out of the second node without processing data from the optical signals, as described above for FIG. 7A.

On the other hand, if switch controller 106 determines in block 704B of FIG. 7B that the signal strength of the first optical signal is not greater than the threshold signal strength, the process of FIG. 7B continues to blocks 708 to 714 to process data from the one or more subsequent optical signals, as described above for FIG. 7A.

In other implementations, the optical signal handling subprocesses of FIGS. 7A and 7B can be combined. For example, in some implementations, blocks 704A and 704A can be combined so that it is determined whether the signal strength of the first optical signal is greater than the threshold signal strength as in block 704B of FIG. 7B and if the number of nodes that have previously received the first optical signal is less than a threshold number of nodes as in block 704A of FIG. 7A. In such an example, if either of these conditions is not true, the second node processes the data from the one or more subsequent optical signals to regenerate the optical signals with a greater signal strength, improved signal quality (e.g., retiming or reshaping), and/or with corrected data to the third node.

Figure 8:
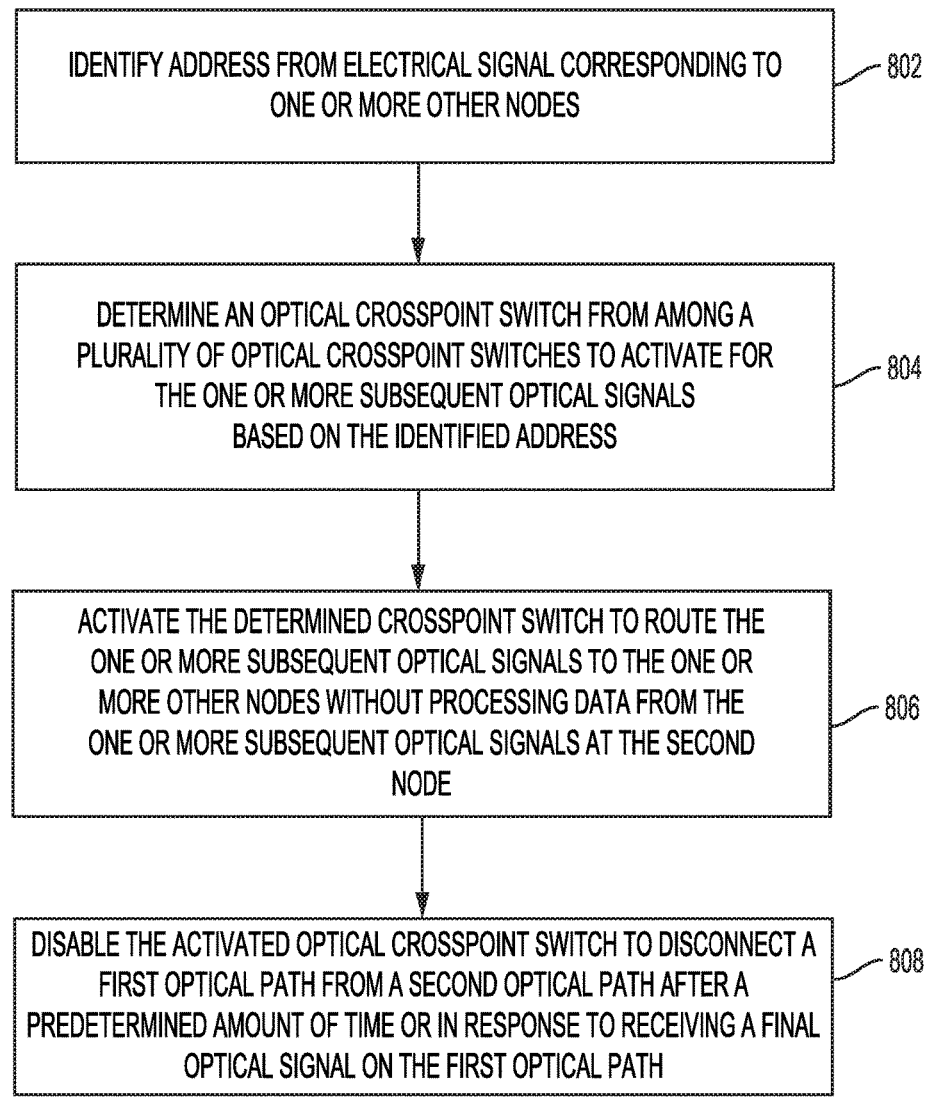
FIG. 8 is a flowchart for an optical signal routing process according to an embodiment.

FIG. 8 is a flowchart for an optical routing process according to an embodiment. In some implementations, the process of FIG. 8 may be performed by switch controller 106 or portions thereof, such as by a bypass module of switch controller 106. The process of FIG. 8 may, for example, be performed as a subprocess of block 706 in FIG. 7A or 7B in activating an optical crosspoint switch (or portion thereof) to route one or more subsequent optical signals from the second node to a third node without processing data from the one or more subsequent optical signals. In addition, the process of FIG. 8 may be performed by each node in a data processing system or by a subset of nodes in a data processing system, such as certain nodes that include multiple input optical paths and multiple output optical paths.

In block 802 in the example process of FIG. 8, switch controller 106 identifies an address from the electrical signal corresponding to the initial optical signal. The address can correspond to a node in network 10 or may correspond to a group of nodes in network 10 accessible by a particular output optical path of optical module 104.

In some implementations, switch controller 106 may access or identify an address from data stored in a buffer for the first optical signal using, for example, deep packet inspection. In some implementations, a destination address may be indicated by a flag or may occupy a particular position, such as in a header of a data packet. The data from the optical signal may also indicate whether it is an initial optical signal or a data path command signal for a subsequent series of related optical signals to be received on an input optical path, such as one of input optical paths 114A in FIG. 4.

In block 804, switch controller 106 determines an optical crosspoint switch to activate from among a plurality of optical crosspoint switches connected to the input optical path for the initial optical signal based on the identified address. In some implementations, an addressing scheme of network 10 may provide information correlating to a particular output optical path to be used to reach the node or nodes corresponding to the identified address. For example, switch controller 106 may use a lookup table to correlate the identified address with an optical crosspoint switch of optical module 104.

In block 806, switch controller 106 activates the determined optical crosspoint switch to route the one or more subsequent optical signals to the one or more other nodes without processing data from the one or more subsequent optical signals at the second node. As discussed above, the processing may include, for example, at least one of converting the one or more subsequent optical signals into corresponding electrical signals, buffering data from the one or more subsequent optical signals, and error correcting data from the one or more subsequent optical signals. In addition to enabling the optical path via the optical crosspoint switch, switch controller 106 may also deactivate or disable certain electrical components in block 806 for an electrical path in node 100 to conserve power while the optical signals are routed out of node 100 without processing the optical signals.

In the example of FIG. 2, switch controller 106 can activate optical crosspoint switch $158_1$ via high speed silicon interposer 130B, connection $176_1$, and switch module $164_1$. As discussed above, some implementations may only activate or energize particular resonators in the optical crosspoint switch so as to selectively route optical signals of a particular channel or frequency of light.

In block 808, switch controller 106 disables the activated optical crosspoint switch to disconnect the input optical path from the output optical path after a predetermined amount of time or in response to receiving a final optical signal on the input optical path. In some implementations, an optical to electrical converter (e.g., optical to electrical converter $153_1$ in FIG. 2) on the input optical path may periodically convert an optical signal received on the input optical path into an electrical signal to snoop or observe whether the series of the one or more subsequent optical signals has ended, or to determine if the signal strength or quality has fallen below a threshold for retiming, reshaping, amplifying, or error correcting the remaining optical signals for retransmission from node 100.

As discussed above, the first optical signal may provide an indication of how long the optical crosspoint switch should remain activated, which may be based on a size of the data transmitted by the optical signals. In other cases, an acknowledgement of completion may be sent from the target destination node on a separate optical path but routed through the same nodes (i.e., on a return path) to quickly indicate optical crosspoint switches that may be deactivated. In yet other cases, an end command may be received during the periodic observation of the optical signals, which causes switch controller 106 to deactivate the optical crosspoint switch and enable or power on any electrical components that may have been powered off during the optical routing via the optical crosspoint switch.

Figure 9:
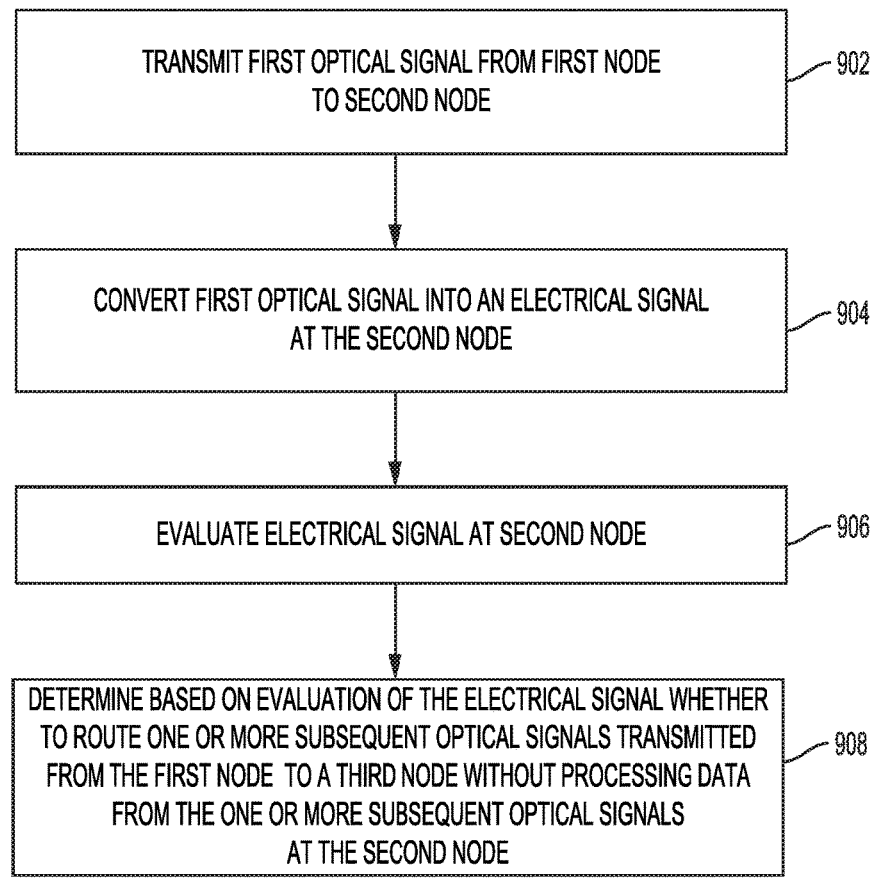
FIG. 9 is a flowchart for an optical signal handling process of a data processing system according to an embodiment.

FIG. 9 is a flowchart for an optical signal handling process of a data processing system according to an embodiment. The process of FIG. 9 may be performed by nodes in a data processing system configured to process data, such as the data processing system shown in FIG. 1 described above. As with the processes discussed above with reference to FIGS. 5 to 8, the process of FIG. 9 may be performed by a subset of nodes in the data processing system, such as by a subset of nodes in the data processing system that are included in a relatively longer ring or torus of optically connected nodes.

In block 902, a first optical signal is transmitted from a first node in the data processing system to a second node in the data processing system. The first optical signal can be an initial optical signal for a series of related optical signals to transmit data from a first or initiator node in the data processing system to a third or target destination node in the data processing system.

In block 904, the first optical signal is converted into an electrical signal at the second node. The conversion may be performed by an optical to electrical converter (e.g., optical to electrical converter 153$_1$ in FIG. 2).

In block 906, the electrical signal is evaluated at the second node. In some implementations, the evaluation can include, for example, buffering data from the first optical signal in a memory of the second node and performing an inspection or analysis of the buffered data, such as a deep packet inspection, to determine a destination for the first optical signal and whether the first optical signal is an initial optical signal in a series of related optical signals.

In block 908, the second node determines based on evaluation of the electrical signal in block 906 whether to route one or more subsequent optical signals transmitted from the first node to a third node without processing data from the one or more subsequent optical signals. As discussed above, the second node may identify an address from the first optical signal indicating the third node or a group of nodes including the third node as the destination for the one or more subsequent optical signals. In such an example, the second node determines to route the one or more subsequent optical signals to the third node without processing data from the one or more subsequent optical signals at the second node. The routing of the one or more subsequent optical signals can be performed by activating an optical crosspoint switch in the optical module of the second node to direct the one or more optical signals received via an input optical path onto an output optical path to the third node without processing data from the optical signals.

In other cases, the second node may determine that it is the target destination node, and as a result, process data from the one or more subsequent optical signals at the second node. The processed data may used by a controller or processor of the second node or may be stored in a memory of the second node.

In yet other cases, the second node may determine that data from the one or more subsequent optical signals should be processed before converting the corresponding electrical signals back into the one or more optical signals with a greater signal strength, improved signal quality, and/or with error corrected data.

Due to the second node's ability to route the one or more subsequent optical signals without processing data from the optical signals, it is possible to have a data processing system with more nodes and/or to make better use of a fewer number of optical connections between the nodes due to the faster speed of travel through transparent intermediate nodes in the network that do not process data from the optical signals. The overall power consumption of the system may also be reduced by powering off certain electrical components that are not needed while the one or more subsequent optical signals are being optically routed without processing data from the optical signals at the intermediate node. Processing and memory resources are also conserved at the transparent intermediate nodes. In addition, the selective ability of intermediate nodes to process data from the one or more subsequent optical signals can allow for the optical signals to continue to travel through more nodes in the data processing system before reaching its target destination.

OTHER EMBODIMENTS

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or a controller to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or a controller, such as, for example, a CPU, an MPU, an MCU, or a DSP, and can include, for example, an FPGA, an ASIC, or other programmable logic device, discrete gate or transistor logic, discrete hardware components, or any combination thereof designed to perform the functions described herein. A processor or controller may also be implemented as a combination of computing devices, e.g., a combination of a DSP and an MPU, a plurality of MPUs, one or more MPUs in conjunction with a DSP core, or any other such configuration. In some implementations, the controller or processor may form at least part of an SoC.

The activities of a method or process described in connection with the examples disclosed herein may be embodied directly in hardware, in a software module executed by a processor or a controller, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or the controller can read information from, and write information to, the storage medium. In the alternative, the storage medium may be integral to the processor or the controller.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A node, comprising:
   an optical module configured to receive optical signals from at least one other node in a network, the optical module including an optical to electrical converter configured to convert optical signals received by the optical module into electrical signals; and
   a switch controller configured to:
      receive an electrical signal from the optical to electrical converter for a first optical signal received by the optical module and converted by the optical to electrical converter;
      determine from the electrical signal at least one of a signal strength of the first optical signal and a number of nodes in the network that have previously received the first optical signal; and
      based on the at least one of the signal strength of the first optical signal and a number of other nodes in the network that have previously received the first optical signal, determine whether to process data from one or more subsequent optical signals or to route the one or more subsequent optical signals out of the node without processing data from the one or more subsequent optical signals.

2. The node of claim 1, wherein the processing of data from the one or more subsequent optical signals includes at least one of converting the one or more subsequent optical signals into corresponding one or more electrical signals, buffering data from the one or more subsequent optical signals, and error correcting data from the one or more subsequent optical signals.

3. The node of claim 1, wherein the switch controller is further configured to:
   compare the determined number of other nodes in the network that have previously received the first optical signal to a threshold number of nodes; and
   determine, based on the comparison of the determined number of other nodes to the threshold number of nodes, whether to process data from the one or more subsequent optical signals or to route the one or more subsequent optical signals out of the node without processing data from the one or more subsequent optical signals.

4. The node of claim 1, wherein the switch controller is further configured to:
   compare the determined signal strength of the first optical signal to a threshold signal strength; and
   determine, based on the comparison of the determined signal strength to the threshold signal strength, whether to process data from the one or more subsequent optical signals or to route the one or more subsequent optical signals out of the node without processing data from the one or more subsequent optical signals.

5. The node of claim 1, wherein in response to determining to process data from the one or more subsequent optical signals, the switch controller is further configured to:
   receive from the optical to electrical converter one or more electrical signals corresponding to the one or more subsequent optical signals; and
   control the optical module to:
      convert the one or more electrical signals back into the one or more subsequent optical signals with a greater signal strength; and
      transmit the one or more subsequent optical signals with the greater signal strength out of the node to another node in the network.

6. The node of claim 1, wherein the switch controller is further configured to:
   determine from the electrical signal received from the optical to electrical converter whether the node is a target destination for the one or more subsequent optical signals.

7. The node of claim 1, wherein in response to determining to route the one or more subsequent optical signals out of the node without processing data from the one or more subsequent optical signals, the switch controller is further configured to:
   activate an optical crosspoint switch of the optical module to route the one or more subsequent optical signals out of the of the node without processing data from the one or more subsequent optical signals.

8. The node of claim 7, wherein the switch controller is further configured to:
   deactivate the activated optical crosspoint switch to disconnect an input optical path from an output optical path after a predetermined amount of time, in response to an acknowledgement of completion from a target destination node in the network, or in response to detecting a final optical signal received on the input optical path.

9. The node of claim 1, wherein the optical module includes a plurality of optical crosspoint switches configured to selectively route optical signals received by the optical module out of the node to respective nodes in the network without processing data from the optical signals, and wherein the switch controller is further configured to:
   identify an address from the electrical signal received from the optical to electrical converter corresponding to one or more other nodes in the network;
   determine an optical crosspoint switch from among the plurality of optical crosspoint switches to activate for the one or more subsequent optical signals based on the identified address; and
   activate the determined optical crosspoint switch to route the one or more subsequent optical signals to the one or more other nodes in the network without processing data from the one or more subsequent optical signals.

10. A data processing system, comprising:
    a plurality of nodes configured to process data; and
    optical connections between nodes of the plurality of nodes, the optical connections configured to carry optical signals between the nodes; and
    wherein each node of the plurality of nodes is configured to:
       receive a first optical signal;
       convert the first optical signal into an electrical signal;
       determine from the electrical signal at least one of a signal strength of the first optical signal and a number of nodes in the data processing system that have previously received the first optical signal; and based on the at least one of the signal strength of the first optical signal and the number of nodes in the data processing system that have previously received the first optical signal, determine whether to process data from one or more subsequent optical signals or to route the one or more subsequent optical signals out of the node without processing data from the one or more subsequent optical signals.

11. The data processing system of claim 10, wherein the processing of data from the one or more subsequent optical signals includes at least one of converting the one or more subsequent optical signals into corresponding one or more electrical signals, buffering data from the one or more subsequent optical signals, and error correcting data from the one or more subsequent optical signals.

12. The data processing system of claim 10, wherein in response to determining to process data from the one or more subsequent optical signals, at least some of the plurality of nodes are each further configured to:
  convert the one or more subsequent optical signals into one or more corresponding electrical signals;
  convert the one or more corresponding electrical signals back into the one or more subsequent optical signals with a greater signal strength; and
  transmit the one or more subsequent optical signals with the greater signal strength out of the node to another node of the plurality of nodes.

13. The data processing system of claim 10, wherein at least some of the plurality of nodes are each further configured to:
  determine from the first optical signal whether the node is a target destination for the one or more subsequent optical signals.

14. The data processing system of claim 10, wherein in response to determining to route the one or more subsequent optical signals out of the node without processing data from the one or more subsequent optical signals, at least some of the plurality of nodes are each further configured to:
  activate an optical crosspoint switch of the node to route the one or more subsequent optical signals out of the of the node without processing data from the one or more subsequent optical signals.

15. The data processing system of claim 14, wherein the at least some of the plurality of nodes are each further configured to:
  deactivate the activated optical crosspoint switch to disconnect an input optical path from an output optical path after a predetermined amount of time, in response to an acknowledgment of completion from a target destination node, or in response to detecting a final optical signal received on the input optical path.

16. The data processing system of claim 10, wherein at least some of the plurality of nodes include a plurality of optical crosspoint switches configured to selectively route optical signals received by the node out of the node to respective nodes in a network without processing data from the optical signals, and wherein the at least some of the plurality of nodes are further configured to:
  identify an address from the first optical signal corresponding to one or more other nodes in the network;
  determine an optical crosspoint switch from among the plurality of optical crosspoint switches to activate for the one or more subsequent optical signals based on the identified address; and
  activate the determined optical crosspoint switch to route the one or more subsequent optical signals to the one or more other nodes in the network without processing data from the one or more subsequent optical signals.

17. A method of operating a node, the method comprising:
  receiving a first optical signal;
  converting the first optical signal into an electrical signal;
  determining from the electrical signal at least one of a signal strength of the first optical signal and a number of nodes in a network that have previously received the first optical signal; and
  based on the at least one of the signal strength of the first optical signal and the number of nodes in the network that have previously received the first optical signal, whether to process data from one or more subsequent optical signals or to route the one or more subsequent optical signals out of the node without processing data from the one or more subsequent optical signals.

18. The method of claim 17, wherein the processing of data from the one or more subsequent optical signals includes at least one of converting the one or more subsequent optical signals into corresponding one or more electrical signals, buffering data from the one or more subsequent optical signals, and error correcting data from the one or more subsequent optical signals.

19. The method of claim 17, further comprising:
  comparing the determined number of other nodes in the network that have previously received the first optical signal to a threshold number of nodes; and
  determining, based on the comparison of the determined number of other nodes to the threshold number of nodes, whether to process data from the one or more subsequent optical signals or to route the one or more subsequent optical signals out of the node without processing data from the one or more subsequent optical signals.

20. The method of claim 17, further comprising:
  comparing the determined signal strength of the first optical signal to a threshold signal strength; and
  determining, based on the comparison of the determined signal strength to the threshold signal strength, whether to process data from the one or more subsequent optical signals or to route the one or more subsequent optical signals out of the node without processing data from the one or more subsequent optical signals.

21. The method of claim 17, wherein in response to determining to process data from the one or more subsequent optical signals, the method further comprises:
  receiving the one or more subsequent optical signals;
  converting the one or more subsequent optical signals into one or more corresponding electrical signals;
  converting the one or more corresponding electrical signals back into the one or more subsequent optical signals with a greater signal strength; and
  transmitting the one or more subsequent optical signals with the greater signal strength out of the node to another node.

22. The method of claim 17, further comprising:
  determining from the electrical signal whether the node is a target destination for the one or more subsequent optical signals.

23. The method of claim 17, wherein in response to determining to route the one or more subsequent optical signals out of the node without processing data from the one or more subsequent optical signals, the method further comprises:

activating an optical crosspoint switch of the node to route the one or more subsequent optical signals out of the of the node without processing data from the one or more subsequent optical signals.

24. The method of claim 23, further comprising deactivating the activated optical crosspoint switch to disconnect an input optical path from an output optical path after a predetermined amount of time, in response to an acknowledgment of completion from a target destination node, or in response to detecting a final optical signal received on the input optical path.

25. The method of claim 17, wherein the node includes a plurality of optical crosspoint switches configured to selectively route optical signals received by the node out of the node to respective nodes without processing data from the optical signals, and wherein the method further comprises:
    identifying an address from the electrical signal corresponding to one or more other nodes;
    determining an optical crosspoint switch from among the plurality of optical crosspoint switches to activate for the one or more subsequent optical signals based on the identified address; and
    activating the determined optical crosspoint switch to route the one or more subsequent optical signals to the one or more other nodes without processing data from the one or more subsequent optical signals.

26. A method of operating a data processing system, the method comprising:
    transmitting a first optical signal from a first node in the data processing system to a second node in the data processing system;
    converting the first optical signal into an electrical signal at the second node;
    determining from the electrical signal at least one of a signal strength of the first optical signal and a number of nodes in the data processing system that have previously received the first optical signal; and
    based on the at least one of the signal strength of the first optical signal and the number of nodes in the data processing system that have previously received the first optical signal, determining whether to process data at the second node from one or more subsequent optical signals transmitted from the first node to the second node or to route the one or more subsequent optical signals to a third node without processing data from the one or more subsequent optical signals at the second node.

27. The method of claim 26, wherein the processing of data from the one or more subsequent optical signals at the second node includes at least one of converting the one or more subsequent optical signals into corresponding one or more electrical signals at the second node, buffering data from the one or more subsequent optical signals at the second node, and error correcting data from the one or more subsequent optical signals at the second node.

28. The method of claim 26, further comprising:
    comparing the determined number of nodes in the data processing system that have previously received the first optical signal to a threshold number of nodes; and
    determining, based on the comparison of the determined number of nodes to the threshold number of nodes, whether to process data from the one or more subsequent optical signals at the second node.

29. The method of claim 26, further comprising:
    comparing the determined signal strength of the first optical signal to a threshold signal strength; and
    determining, based on the comparison of the determined signal strength to the threshold signal strength, whether to process data from the one or more subsequent optical signals at the second node.

30. The method of claim 26, wherein in response to determining to process data from the one or more subsequent optical signals at the second node, the method further comprises:
    converting, at the second node, the one or more subsequent optical signals into the one or more corresponding electrical signals;
    converting, at the second node, the one or more corresponding electrical signals back into the one or more subsequent optical signals with a greater signal strength; and
    transmitting the one or more subsequent optical signals with the greater signal strength from the second node to the third node.

31. The method of claim 26, further comprising:
    determining from the electrical signal whether the second node is a target destination for the one or more subsequent optical signals.

32. The method of claim 26, wherein in response to determining to route the one or more subsequent optical signals from the second node to the third node without processing data from the one or more corresponding electrical signals at the second node, the method further comprises:
    activating an optical crosspoint switch of the second node to route the one or more subsequent optical signals from the second node to the third node without processing the one or more subsequent optical signals at the second node.

33. The method of claim 32, further comprising deactivating the activated optical crosspoint switch to disconnect an input optical path from an output optical path at the second node after a predetermined amount of time, in response to an acknowledgment of completion from a target destination node, or in response to detecting a final optical signal received on the input optical path.

34. The method of claim 26, wherein the second node includes a plurality of optical crosspoint switches configured to selectively route optical signals received by the second node to respective nodes in the data processing system without processing data from the received optical signals at the second node, and wherein the method further comprises:
    identifying, at the second node, an address from the electrical signal corresponding to one or more other nodes in the data processing system including the third node;
    determining an optical crosspoint switch from among the plurality of optical crosspoint switches of the second node to activate for the one or more subsequent optical signals based on the identified address; and
    activating the determined optical crosspoint switch to route the one or more subsequent optical signals to the third node without processing data from the one or more subsequent optical signals at the second node.

35. A node, comprising:
    an optical module configured to receive optical signals from at least one other node in a network, the optical module including an optical to electrical converter configured to convert optical signals received by the optical module into electrical signals; and a switch controller configured to:
    receive an electrical signal from the optical to electrical converter for a first optical signal received by the optical module and converted by the optical to electrical converter;
    determine from the electrical signal received from the optical to electrical converter whether to process data from one or more subsequent optical signals or to route the one or more subsequent optical signals out of the node without processing data from the one or more subsequent optical signals; and
    in response to determining to process data from the one or more subsequent optical signals, the switch controller is further configured to:
        receive from the optical to electrical converter one or more electrical signals corresponding to the one or more subsequent optical signals; and
        control the optical module to:
            convert the one or more electrical signals back into the one or more subsequent optical signals with a greater signal strength; and
            transmit the one or more subsequent optical signals with the greater signal strength out of the node to another node in the network.

36. A node, comprising:
an optical module configured to receive optical signals from at least one other node in a network, the optical module including:
    an optical to electrical converter configured to convert optical signals received by the optical module into electrical signals; and
    a plurality of optical crosspoint switches configured to selectively route optical signals received by the optical module out of the node to respective nodes in the network without processing data from the optical signals; and
wherein the node further comprises:
    a switch controller configured to:
        receive an electrical signal from the optical to electrical converter for a first optical signal received by the optical module and converted by the optical to electrical converter;
        determine from the electrical signal received from the optical to electrical converter whether to process data from one or more subsequent optical signals or to route the one or more subsequent optical signals out of the node without processing data from the one or more subsequent optical signals;
        identify an address from the electrical signal received from the optical to electrical converter corresponding to one or more other nodes in the network;
        determine an optical crosspoint switch from among the plurality of optical crosspoint switches to activate for the one or more subsequent optical signals based on the identified address; and
        activate the determined optical crosspoint switch to route the one or more subsequent optical signals to the one or more other nodes in the network without processing data from the one or more subsequent optical signals.

* * * * *